(12) United States Patent
Bhavsar

(10) Patent No.: US 7,631,697 B2
(45) Date of Patent: *Dec. 15, 2009

(54) OILFIELD APPARATUS COMPRISING SWELLABLE ELASTOMERS HAVING NANOSENSORS THEREIN AND METHODS OF USING SAME IN OILFIELD APPLICATION

(75) Inventor: Rashmi B. Bhavsar, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/564,467

(22) Filed: Nov. 29, 2006

(65) Prior Publication Data

US 2008/0125335 A1    May 29, 2008

(51) Int. Cl.
*E21B 23/00* (2006.01)
*E21B 33/12* (2006.01)

(52) U.S. Cl. .................... 166/381; 166/387; 166/179; 166/65.1; 166/316; 166/205

(58) Field of Classification Search ........................ None
See application file for complete search history.

(56) References Cited

U.S. PATENT DOCUMENTS

| | | |
|---|---|---|
| 4,422,987 A | 12/1983 | Arimatsu |
| 4,631,952 A | 12/1986 | Donaghey |
| 5,144,841 A | 9/1992 | Brouwers |
| 5,173,658 A | 12/1992 | Astrachan |
| 5,311,779 A | 5/1994 | Teruo |
| 5,341,128 A | 8/1994 | Keyser |
| 5,345,213 A | 9/1994 | Semancik |

(Continued)

FOREIGN PATENT DOCUMENTS

EP    1533469 A1    5/2005

(Continued)

OTHER PUBLICATIONS

Al-Anazi, H.A. and Sharma, M.M., "Evaluation of a pH-Sensitive Polymer for Gravel-Packing Operations", SPE 67292, Mar. 2001, pp. 1-10, SPE International, Oklahoma City, Oklahoma, U.S.

(Continued)

*Primary Examiner*—Zakiya W Bates
*Assistant Examiner*—Angela M DiTrani
(74) *Attorney, Agent, or Firm*—Jeremy P. Welch; James L. Kurka

(57) ABSTRACT

An oilfield apparatus has a swellable elastomeric composition that includes a swellable elastomer and one or more nanosensors dispersed therein. An oilfield assembly for exploring for, drilling for, testing for, or producing hydrocarbons includes various oilfield elements such as tubing, jointed pipe, sucker rods, submersible pump motor protector bags, packer elements, blow out preventer elements, zonal isolation tool elements, etc; and one or more of the oilfield elements has a swellable elastomeric composition that includes a swellable elastomer and one or more nanosensors dispersed therein. A method of selecting one or more oilfield elements has a component of an elastomeric composition that includes a swellable elastomer and one or more nanosensors dispersed therein; and a method of using the one or more oilfield elements in an oilfield operation, thus exposing the oilfield element to an oilfield environment.

18 Claims, 4 Drawing Sheets

U.S. PATENT DOCUMENTS

| | | | |
|---|---|---|---|
| 5,367,282 | A | 11/1994 | Clem |
| 5,367,376 | A | 11/1994 | Lagakos |
| 5,387,462 | A | 2/1995 | Debe |
| 5,553,500 | A | 9/1996 | Grahn |
| 5,604,314 | A | 2/1997 | Grahn |
| 5,896,191 | A | 4/1999 | Beier |
| 5,905,212 | A | 5/1999 | Moses |
| 6,079,873 | A | 6/2000 | Cavicchi |
| RE37,065 | E | 2/2001 | Grahn |
| 6,345,825 | B1 | 2/2002 | Guth |
| 6,679,129 | B2 | 1/2004 | Savard |
| 6,705,152 | B2 | 3/2004 | Routkevitch |
| 6,742,395 | B1 | 6/2004 | Borgers |
| 6,888,537 | B2 | 5/2005 | Benson |
| 2002/0117659 | A1 | 8/2002 | Lieber |
| 2004/0060696 | A1 | 4/2004 | Schultz |
| 2004/0173363 | A1 | 9/2004 | Navarro-Sorroche |
| 2005/0088299 | A1 | 4/2005 | Bandy |
| 2005/0109502 | A1 | 5/2005 | Buc Slay |
| 2005/0161212 | A1 | 7/2005 | Leismer |
| 2005/0199401 | A1 | 9/2005 | Patel |
| 2007/0256485 | A1 | 11/2007 | Rensel |
| 2008/0121390 | A1* | 5/2008 | O'Malley et al. ........... 166/207 |

FOREIGN PATENT DOCUMENTS

| | | |
|---|---|---|
| GB | 2398389 A | 8/2004 |
| WO | 2006103630 A1 | 10/2006 |

OTHER PUBLICATIONS

Al-Anazi, H.A. and Sharma, M.M., "Evaluation of a pH-Sensitive Polymer for Gravel-Packing Operations", SPE 76813 (a revision of SPE 67292), Jan. 2002, pp. 28-36, Mar. 2002, SPE Drilling & Completion, SPE International, Oklahoma City, Oklahoma, U.S.

Al-Anazi, H.A. and Sharma, M.M., "Use of a pH-Sensitive Polymer for Conformance Control", SPE 73782, Feb. 2002, pp. 1-8, SPE International, Lafayette, Louisiana, U.S.

* cited by examiner

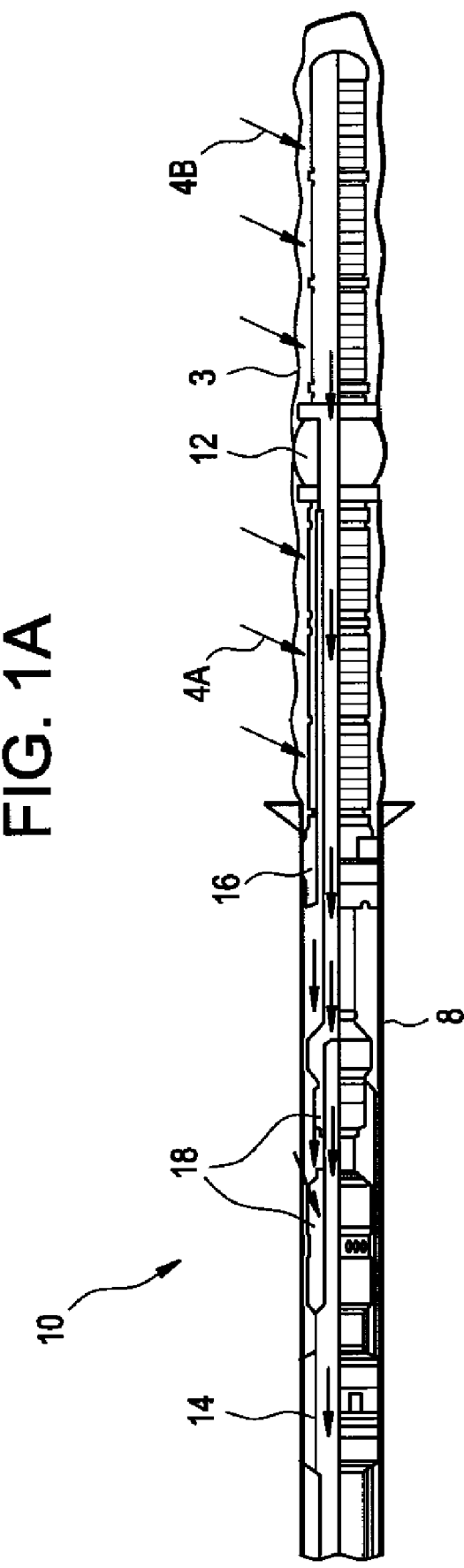

FIG. 3A
FIG. 3B
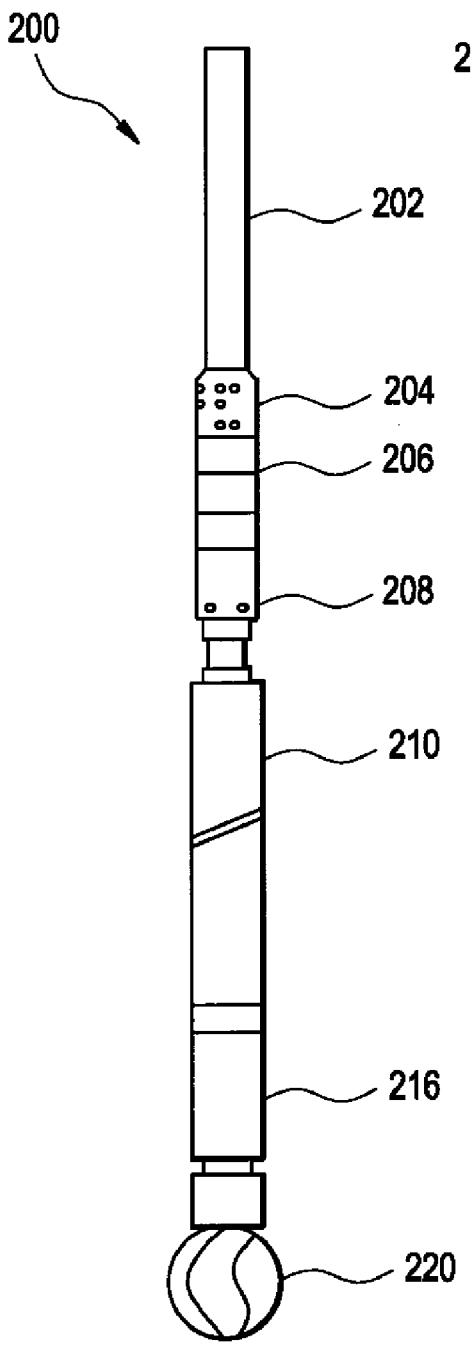
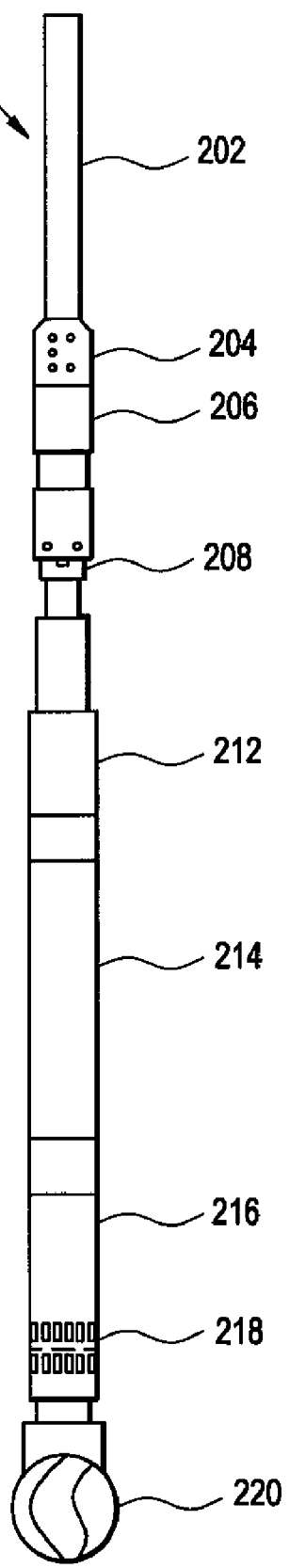

OILFIELD APPARATUS COMPRISING SWELLABLE ELASTOMERS HAVING NANOSENSORS THEREIN AND METHODS OF USING SAME IN OILFIELD APPLICATION

BACKGROUND OF THE INVENTION

1. Field of Invention

The present invention relates generally to the field of oilfield exploration, production, and testing, and more specifically to swellable elastomeric materials comprising nanoscale materials and their uses in such ventures.

2. Related Art

Recently there has been a growing interest in swellable elastomers for use in oilfield applications. Oil-swellable packers are now on the market, as well as expandable zonal isolation profilers that use a water-swellable elastomer. There are reported to be water-swellable and oil-swellable packers on the market for oilfield applications, although it is not known if these packers swell in both oil and water. Other oilfield elements and tools may utilize swellable elastomers, for example, swellable elastomers and other polymers may be used in blow out preventer elements.

Nanocomposites are a relatively new class of composites that are particle-filled polymers for which at least one dimension of the dispersed particle is in the nanometer range ($10^{-9}$ meter). Because of the size of the dispersed particles, certain nanocomposites may exhibit improved mechanical, thermal, optical, and electrical properties as compared to pure polymers or conventional composites.

U.S. Pub. Pat. App. No. 20020117659 discloses nanowires and nanoscale devices and more particularly a nanoscale device having a nanowire or functionalized nanowires for detecting the presence or absence of an analyte suspected to be present in a sample, and methods for using same. U.S. Pat. No. 6,705,152 discloses sensors comprising micromachined anodic aluminum oxide films which contain an extremely high density of nanoscale pores (e.g., $10^{11}$ $cm^{-2}$). Sensing materials deposited inside this self-organized network of nanopores have ultra-high surface area and nanometer grain structure, therefore enabling high sensitivity. The sensors are described as robust and stable in harsh environments, and may be used for both chemical gas and physical (humidity, temperature) sensors and sensor arrays. U.S. Pat. No. 4,631,952 discloses a method of preparing a sensor by the formation of a dispersion of conducting particles within a polymeric material capable of swelling in the presence of the liquid, gas or vapor to be sensed; however, the sensors do not appear to be able to measure temperature, pressure, or anything but the presence or absence of the liquid, gas or vapor to be sensed, based on increasing resistivity as the particles are separated as the polymer swells. Disclosed particle sizes range from about 0.001 to about 10 microns (1 nanometer to about 10,000 nanometers). Examples of conductive particles are gold, platinum, silver, copper, nickel, stainless steel, ferrite, electrically conductive carbon black, and the like. U.S. Pat. No. 5,387,462 teaches a method of making a sensor for gas, vapor, and liquid from a composite article with an electrically conductive surface having an array of whisker-like microstructures with an aspect ratio of 3:1 to 100:1. U.S. Pat. No. 5,345,213 teaches a method for fabrication of temperature-controlled micromachined arrays for chemical sensor fabrication and operation. U.S. Pat. No. 6,079,873 describes a micro-hotplate-based differential calorimeter for detecting gases and chemical reactions. Although these prior methods provide improved methods for producing sensors and for detection of a particular gas and/or liquid, there is no disclosure of swellable polymeric materials comprising nanoscale sensors able to detect important downhole parameters, such as temperature and pressure. So far as is known, oilfield apparatus comprising nanosensors dispersed in a swellable elastomer have not been reported, nor their use in oilfield applications.

Common to all oilfield uses of swellable elastomers is exposure to hostile environments, such as hostile organic and inorganic chemicals, temperatures, pressures and mechanical subterranean environments that tend to unacceptably decrease the life and reliability of the swellable elastomers. There remains a need in the natural resources exploration, production, and testing field for improved data gathering capabilities to monitor and/or ascertain temperature, pressure, viscosity, pH and other data about the wellbore environment in the vicinity of a swellable elastomer.

SUMMARY OF THE INVENTION

In accordance with the present invention, apparatus comprising a composition comprising a swellable elastomer and a nanosensor shaped into the form of an oilfield elements, oilfield elements comprising an apparatus, and methods of using the oilfield elements are described that reduce or overcome problems in previously known oilfield apparatus, oilfield elements, and methods. By combining the properties of swellable elastomers with the properties of nanosensors and optionally other additives, inventive oilfield apparatus and elements may be prepared and used in inventive methods.

A first aspect of the invention is an apparatus comprising a swellable elastomeric composition having one or more nanosensors dispersed (uniformly or non-uniformly) therein and shaped into an oilfield element.

As used herein the term "swellable elastomeric composition" includes any composition having desired elastomeric and swelling properties for the intended purpose of the oilfield element in question. For example, in some embodiments an elastomeric composition may comprise substantially all elastomer, while in other formulations the elastomer may be accompanied by one or more other polymeric or non-polymeric compositions, such as thermoplastic and thermoset polymers, plasticizers, non-nanosensor fillers, shape stabilizers, and the like.

As used herein the term "nanosensor" is a material having at least one feature having nanoscale dimension. The feature of the material may be pore diameter, wire diameter, platelet length, particle mean diameter, sensing element or material thickness, and the like. The material may be functionalized or non-functionalized. In one set of embodiments, nanosensors may be nanowires, or functionalized nanowires. As used herein, the term "nanoscale dimension" means the dimension may be less than 500 nanometers; in some embodiments less than 200 nanometers; in other embodiments less than 150 nanometers; in yet other embodiments less than 100 nanometers; in exemplary embodiments less than 70; still other embodiments less than 50 nanometers; in other embodiments less than 20 nanometers; yet other embodiments less than 10 nanometers; and in yet other embodiments less than 5 nanometers. In certain exemplary embodiments the dimension may be less than 2 nanometers or less than 1 nanometer. In one set of embodiments the feature has at least one dimension ranging from 0.5 nanometer to 200 nanometers. Nanosensors may have a core and an outer region. In these the above dimensions relate to those of the core. A "nanowire" is an elongated nanoscale semiconductor which, at any point along its length, has at least one cross-sectional dimension and, in some embodiments, two orthogonal cross-sectional dimensions having the above dimensions. The cross-section of the elongated semiconductor may have any arbitrary shape, including, but not limited to, circular, square, rectangular, elliptical and tubular. Regular and irregular shapes are included. A non-limiting list of examples of materials from which nanosensors useful in the invention can be made appears below. Nanotubes are a class of nanowires that find use in the invention and may include wires of scale commensurate with nanotubes. As used herein, a "nanotube" is a nanowire that has a hollowed-out core, and includes those nanotubes known to those of ordinary skill in the art. A "non-nanotube nanowire" is any nanowire that is not a nanotube. In one set of embodiments of the invention, a non-nanotube nanowire having an unmodified surface (not including an auxiliary reaction entity not inherent in the nanotube in the environment in which it is positioned) may be used in any arrangement of the invention described herein in which a nanowire or nanotube can be used. A "wire" refers to any material having a conductivity at least that of a semiconductor or metal. For example, the term "electrically conductive" or a "conductor" or an "electrical conductor" when used with reference to a "conducting" wire or a nanowire refers to the ability of that wire to pass charge through itself. Electrically conductive materials may have a resistivity lower than about $10^{-3}$, or lower than about $10^{-4}$, or lower than about $10^{-6}$ or $10^{-7}$ ohmmeters.

Swellable elastomers useful in the swellable elastomeric compositions may be selected from natural rubber and any substance emulating natural rubber in that they stretch under tension, have a high tensile strength, retract rapidly, and substantially recover their original dimensions. The term includes natural and man-made elastomers, and the elastomer may be a thermoplastic elastomer or a non-thermoplastic elastomer. The term includes blends (physical mixtures) of elastomers, as well as copolymers, terpolymers, and multipolymers. Examples include ethylene-propylene-diene polymer (EPDM), various nitrile rubbers which are copolymers of butadiene and acrylonitrile such as Buna-N (also known as standard nitrile and NBR). By varying the acrylonitrile content, elastomers with improved oil/fuel swell or with improved low-temperature performance can be achieved. Specialty versions of carboxylated high-acrylonitrile butadiene copolymers (XNBR) provide improved abrasion resistance, and hydrogenated versions of these copolymers (HNBR) provide improve chemical and ozone resistance elastomers. Carboxylated HNBR is also known. In certain exemplary embodiments the swellable elastomer may be the reaction product of a linear or branched polymer having residual ethylenic unsaturation with an ethylenically unsaturated organic monomer having at least one reactive moiety selected from acid, acid anhydride, and acid salt. Other useful swellable elastomers are discussed herein.

The elastomeric composition may comprise any number of non-nanosensor additives, such as fillers, plasticizers, accelerants, fibers, nanoflakes and/or nanoplatelets and the like, depending on the end use of the oilfield element. One such additive is an inorganic swelling agent, which functions to enhance the water-swellability of the elastomeric compositions useful in the invention. Inorganic swelling agents useful for this purpose include alkali- and alkaline earth carbonates, such as, but not limited to, carbonates of sodium (sodium carbonate; soda ash).

Apparatus in accordance with the invention include those wherein the elastomeric composition is vulcanized by an organic vulcanizing agent. Examples of organic vulcanization elements useful in the invention may be selected from organic peroxides, such as, but not limited to, dicumyl peroxide.

The elastomer composition may be selected from any elastomer listed in ASTM D1418, and may comprise one or more non-elastomeric polymers selected from natural and synthetic polymers, including those listed in ASTM D1600-92, "Standard Terminology for Abbreviated Terms Relating to Plastics". The elastomer and non-elastomer may be layered, wherein individual layers may be the same or different in composition and thickness, interpenetrating networks, and the like. Non-elastomeric polymers may include, but are not limited to, thermoplastic polymers, such as polyolefins, polyamides, polyesters, thermoplastic polyurethanes and polyurea urethanes, copolymers, and blends thereof, and the like; one or more thermoset polymers, such as phenolic resins, epoxy resins, and the like.

Apparatus within the invention include those wherein the oilfield element may be any element exposed to water, brine, low pH fluids, and/or hydrocarbon fluids, such as, but not limited to packer elements (the elastomeric components), submersible pump motor protector bags, sensor protectors, blow out preventer elements, O-rings, T-rings, gaskets, pump shaft seals, tube seals, valve seals, seals and insulators used in electrical components, such as wire and cable semiconducting shielding and/or jacketing, power cable coverings, seals and bulkheads such as those used in fiber optic connections and other tools, and pressure sealing elements for fluids (gas, liquid, or combinations thereof).

Another aspect of the invention are oilfield assemblies for exploring for, testing for, or producing hydrocarbons, one oilfield assembly comprising:
  (a) one or more oilfield elements; and
  (b) one or more of the oilfield elements comprising an apparatus comprising a swellable elastomeric composition having one or more nanosensors dispersed (uniformly or non-uniformly) therein as described in the first aspect of the invention.

Yet another aspect of the invention are methods of exploring for, drilling for, or producing hydrocarbons, one method comprising:
  (a) selecting one or more oilfield elements having a component comprising a swellable elastomeric composition having one or more nanosensors dispersed (uniformly or non-uniformly) therein as described in the first aspect of the invention; and
  (b) using the oilfield element in an oilfeld operation, thus exposing the oilfield element to an oilfield environment.

Methods of the invention may include, but are not limited to, running one or more oilfield elements into a wellbore using one or more surface oilfield elements, and/or retrieving the oilfield element from the wellbore. The oilfield environment during running and retrieving may be the same or different from the oilfield environment during use in the wellbore or at the surface.

The various aspects of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which:

FIGS. 1A and 1B are schematic side elevation views, partially in longitudinal cross section, of a completion assembly comprising an embodiment of a zonal isolation tool constructed in accordance with the invention;

FIGS. 3A and 3B are schematic side elevation views of two bottom hole assemblies utilizing elements comprising a swellable elastomeric composition comprising nanosensors in accordance with the invention.

Figure 1B:
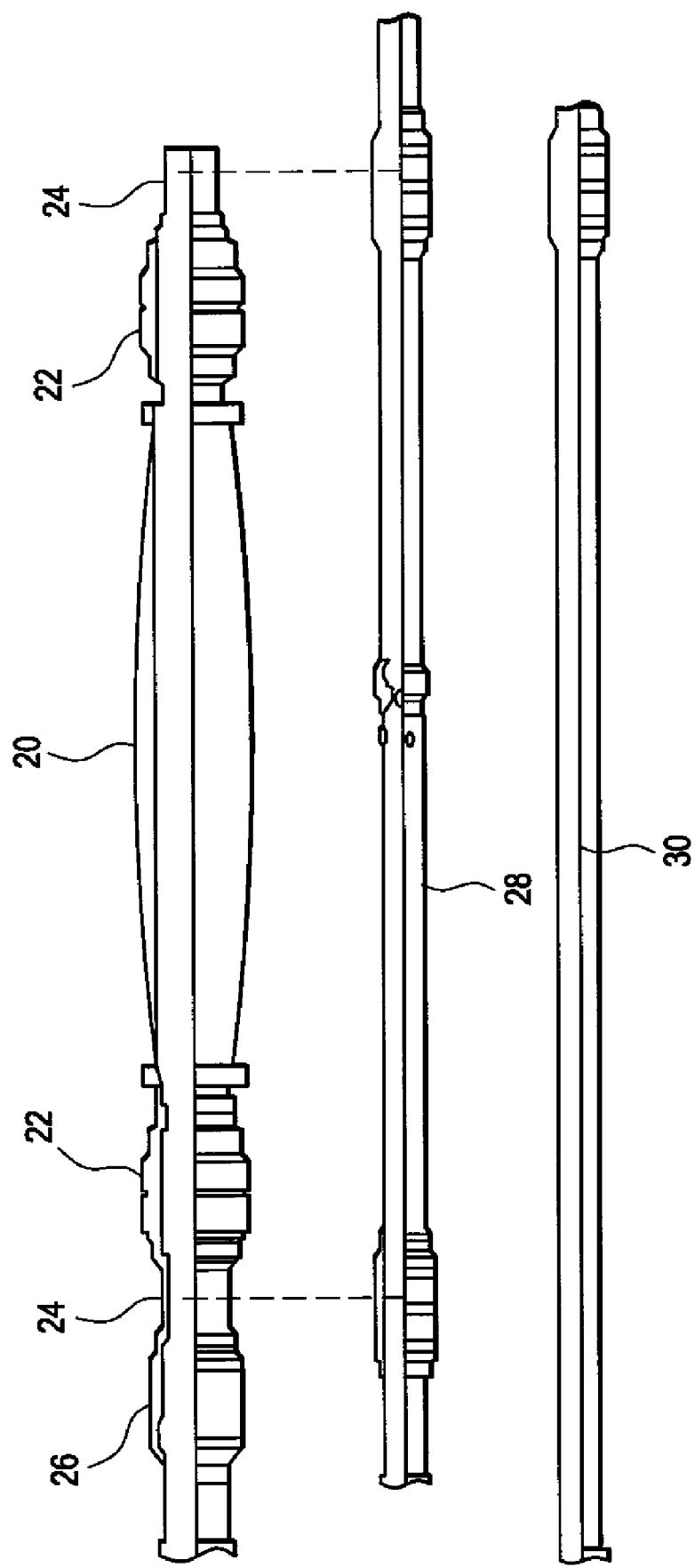

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

The invention describes apparatus comprising a swellable elastomeric composition comprising a swellable elastomer and a nanosensor dispersed therein, shaped into the form of an oilfield element. The apparatus may be incorporated into oilfield assemblies, and the assemblies used in oilfield applications, including hydrocarbon exploration, drilling, testing, completion, and production activities. As used herein the term "oilfield" includes land based (surface and sub-surface) and sub-seabed applications, and in certain instances seawater applications, such as when hydrocarbon exploration, drilling, testing or production equipment is deployed through seawater. The term "oilfield" as used herein includes hydrocarbon oil and gas reservoirs, and formations or portions of formations where hydrocarbon oil and gas are expected but may ultimately only contain water, brine, or some other composition. A typical use of the apparatus comprising a swellable elastomeric composition will be in downhole applications such as well or reservoir stimulation operations, zonal isolation of wellbores, and the like although the invention is not so limited. A "wellbore" may be any type of well, including, but not limited to, a producing well, a non-producing well, an injection well, a fluid disposal well, an experimental well, an exploratory well, and the like. Wellbores may be vertical, horizontal, deviated some angle between vertical and horizontal, and combinations thereof, for example a vertical well with a non-vertical component.

Nanosensors as used herein function to sense, detect, monitor, transmit, measure, compare, collect, store, calculate and/or determine information on any one or more parameters useful in oilfield operations. Useful parameters depend on the oilfield operation, but may include, but are not limited to, properties selected from chemical composition, chemical reactivity, chemical moieties, physical properties (temperature, pressure), fluid mechanical properties (such as viscosity), transport phenomena coefficients and parameters (such as friction coefficients, mass transfer coefficients, diffusion coefficients, permeation coefficients, and the like), electrical properties, gas-to-liquid ratio, and any two or more of these properties. As used herein the term "nanosensor" is a material having at least one feature having nanoscale dimension. The feature of the material may be pore diameter, wire diameter, platelet length, particle mean diameter, and the like. The material may be functionalized or non-functionalized. In one set of embodiments, nanosensors may be nanowires, or functionalized nanowires.

One set of useful nano sensors for detection of chemical composition may be the materials described in U.S. Pat. No. 4,631,952, incorporated herein by reference. This patent describes a swellable matrix which contains an intimate admixture of conductive particles and electrical means for forming an electrical contact thereto. Upon exposure to a vapor, liquid or gas, the matrix swells and thus moves the conductive particles apart relative to each other. This causes an increase in measured resistance by the detector. Intimately admixing the conductive particles within a swellable matrix provides an increased a lifetime and more uniform response for the detector sensor than resistive sensor devices which merely incorporate the conductive particles on the surface of a resilient material where the conductive particles are subject to poisoning by the organic substance, and capable of being knocked off or damaged. Poisoning or loss of conductive particles affects the base line response characteristics of the device. Furthermore, the intimate admixture of the conductive particles within the swellable matrix provides for a more rugged device which can be manufactured in odd sizes and shapes for placement in difficult and/or tight environments. Preferably the swellable matrix is low cost, has a non-crystalline structure to enhance its solubility toward the organics of interest, and is processable to a substantially uniform compositional mixture with the conductive particles. Examples of suitable materials are synthetic rubber, polyvinyl chloride, polymethyl methacrylate, TYGON™, silicone and the like. The conductive particles should be more electrically conductive than the swellable matrix. Preferably, the particles are inert to the organics to be sensed and to water or water vapor, and sufficiently smooth surfaced so as not to tear the swellable matrix. Suitable sizes are less than 100 microns. Preferred sizes range from about 0.001 to about 10 microns and most preferably, from about 0.01 to 1 micron. Long fibrous shapes which can be mixed within the swellable matrix to overlap are preferred for a swellable matrix that swells more than 25% upon exposure to organics. Examples of conductive particles are gold, platinum, silver, copper, nickel, stainless steel, ferrite, electrically conductive carbon, and the like. Conductive carbon blacks are preferred because of their low cost and general inertness to organics.

Another useful set of nanosensors useful in the invention are described in U.S. Pat. No. 6,705,152, which is also incorporated herein by reference. This patent describes a type of nanostructured ceramic platform for gas sensors and sensor arrays. These sensors comprise micromachined anodic aluminum oxide films, which contains extremely high density (e.g., $10^{11}$ cm$^{-2}$) nanoscale pores. Sensing materials deposited inside this self-organized network of nanopores have ultra-high surface area and nanometer grain structure, therefore enabling high sensitivity. Refractory nature of alumina ceramic enables the desired robustness, long lifetime and stability in harsh environment. This sensor platform can be used for both chemical gas and physical (humidity, temperature) sensors and sensor arrays. The patent describes use of micromachined nanoporous anodic aluminum oxide (AAO) as a gas microsensor and microsensor array platform.

"Sensitivity", as that term is used in the 152 patent, and incorporated herein, is a dimensionless measure determined from the ratio of the change in a measured property to the original value of that property.

An anodic alumina (AAO) substrate comprises a high density of substantially uniform and substantially parallel nano-sized pores which are substantially perpendicular to the surface of the film. Once the raw substrate is formed by etching, cutting, or other machining processes into a shape suitable for a sensor, it is referred to as a sensor substrate. A highly anisotropic nanoporous morphology of AAO leads to the material exhibiting etching anisotropy, which may be used for micromachining sensor substrates and sensor array substrates. The nanoporous morphology of the AAO substrate is formed by electrochemical anodization of aluminum using electrolytes, which promote electric field assisted oxide dissolution.

A device is formed by providing electrodes comprising a conductive material in electrical contact with the sensor substrate and/or sensing element(s) such that current flow through the sensing element(s) can be induced and measured. In one particular example discussed in the 152 patent, a microheater is incorporated in an integrated fashion, e.g., on one surface of the sensing element, and powered by microheater power nodes to implement a resistive heater. The microheater is useful in operation to provide either pulsed or steady state heating of the sensing element(s) 24.

Diameter of nanopores is tunable in the range from 1 to 500 nanometers by controlling the anodization conditions such as anodization current, anodization voltage, electrolyte concentration, anodization rate, and the like. Thickness of such films may be varied from 0.1 to 500 micrometers. Annealing of anodic alumina films leads to the formation of secondary pores in the walls of the initial pores. Such annealing is performed, for example, using a thermal treatment ranging from 500° C. to 1200° C. in a forming gas, air, or oxygen containing environment. The formation of secondary pores is accompanied by a sharp increase in specific surface area, chemical, thermal, and mechanical stability.

According to the 152 patent, gas sensors and sensor array substrates comprise nanostructured ceramic dies of a particular shape. The sensor substrate can be formed into any desired shape including circular, elliptical, and polygonal. Depending on the packaging options, the die may or may not contain micromachined holes for contact pins. In the particular examples, sensing elements are preferably thermally decoupled from the rest of the die by micromachining them into a bridge-type or a cantilever-type structure, with optional thermal relief gaps machined to relieve the thermal and mechanical stress caused by the operation of the microheater. The size of the die is preferably 0.1 mm to 200 mm, and more preferably from 2 to 20 mm, depending on the number of sensors in an array, the size of the package, and the size of the sensing element. The size of the sensing elements along the largest dimension is preferably 0.005 mm to 100 mm, and more preferably 0.05 mm to 10 mm, depending on the sensor specifications, especially the desired power consumption. A plurality of sensing elements can be formed into an array. The sensor substrate is preferably annealed to increase its surface area and chemical, mechanical and thermal stability.

The nanoporous sensing elements may be coupled to signal electrodes deposited on one or both faces of the sensing element of the array sensor implementation. The electrode deposition is illustrated in the patent. To enable gas permeability, metal films of specific thickness are used, which are conductive but do not close the pores. The thickness of the gas permeable metal films can be in the range of 10 to 500 nanometers, depending on the pore diameter. Temperature control of the sensing elements is enabled with thin film resistive microheaters. The thickness of thin film microheaters may range from 10 nm to 500 nm, r from 20 nm to 150 nm. The lateral dimensions of the microheater can be varied, depending on the size of the sensing element. Thickness, size and the material composition of microheater is tuned to obtain resistance preferably 2 Ohms to 500 Ohms.

As explained in the 152 patent, a microheater may be used as a temperature detector. A microheater can also be used as one of the sensing electrodes. In another embodiment, a microheater may be separated from the sensing electrode by an insulating layer. The sensor may also be partially or completely coated to protect the electrodes from environmental damage. In other embodiments, the electrode and microheater may comprise any composition that conducts the signal more easily than the sensing layer, and preferably with a lower impedance than the sensing layer. The composition of the electrode and microheater films may include inorganic materials, metallic, alloy, ceramic, non-metallic, ceramic-ceramic composite, ceramic-metal composite, metal-metal composite, and their combinations. Electrode geometries include porous or dense, flat or tapered, uniform or non-uniform, planar or wavy, straight or curved, non-patterned or patterned, grain size confined or not, and combinations of these geometries. Methods of forming the sensing electrodes and microheater include physical sputtering, reactive sputtering, physical vapor deposition, chemical vapor deposition, ion beam, e-beam deposition, molecular beam epitaxy, laser deposition, plasma deposition, electrochemical deposition, screen and stencil printing, brush painting, lift-off lithography, shadow mask deposition and combinations of these methods.

According to the 152 patent, different materials may be deposited inside the pores of anodic alumina using a variety of processes, faithfully replicating its morphology. This will provide nanostructured, high surface area (up to 500 $m^2/g$) sensitive elements with higher signal-to-noise and improved performance in comparison with the planar substrates. Methods of deposition of the sensing layer include spin coating, dip coating, spray coating, solution impregnation, physical sputtering, reactive sputtering, physical vapor deposition, chemical vapor deposition, atomic layer chemical vapor deposition via binary reaction sequences, ion beam, e-beam deposition, molecular beam epitaxy, laser deposition, plasma deposition, electrophoretic deposition, magnetophoretic deposition, thermophoretic deposition, stamping, centrifugal casting, gel casting, extrusion, electrochemical deposition, screen and stencil printing, brush painting, and combinations of these methods.

The sensing layer thickness may range from 0.1 nm to 500 nm, and may be less than 100 nm, and less than 10 nm in some embodiments. The sensing layer may be doped with catalysts and promoters to further enhance the selectivity of interaction or the kinetics of interaction, and to enhance the ability to detect the changes in the properties of the material composition. These secondary treatments of the sensing layer may enhance the performance of the sensing layer. Additionally, the sensing layer inside the pores may be porous or dense, conformal or tapered, planar or wavy, single layer or multi-layered, or a combination of one or more of these.

Possible compositions of the sensing layer include but are not limited to organic, inorganic, metallic, alloy, ceramic, conducting polymer, non-conducting polymer, ion conducting, non-metallic, ceramic-ceramic composite, ceramic-polymer composite, ceramic-metal composite, metal-polymer composite, polymer-polymer composite, metal-metal composite, metal salts, metal complexes, bio-organisms, biologically active materials, biologically derived materials, bio-composites, or a combination of one or more of these. Illustrative compositions include but are not limited to doped or un-doped, stoichiometric or non-stoichiometric titanium oxide, barium titanate, strontium titanate, zinc oxide, indium oxide, zirconium oxide, tin oxide, antimony oxide, tungsten oxide, molybdenum oxide, tantalum oxide, cerium oxide, iron oxide, manganese oxide, rare earth oxides, binary and ternary complex oxides, lithium chloride, magnesium chloride, silicon carbide, bismuth telluride, gallium nitride, silicon, germanium, titanium boride, iron boride, zirconates, aluminates, tungstates, stannates, zincates, carbides, borates, hydrides, oxides, oxynitrides, oxycarbides, halides, silicates, phosphides, nitrides, chalcogenides, enzymes, nucleotides, antibodies, cells, and polymers.

Alternatively, deposition of nanostructured sensing materials may be performed after the electroding and packaging of the sensor substrate. For example, selected properties of the sensing elements, such as its resistance is monitored in situ while the deposition process is conducted in the gas or liquid phase. This provides a feedback for controlling the deposition process and terminating the deposition as soon as desired value for the controlled parameter is achieved. The microheater may be used to locally control the deposition process temperature, thus effectively confining the deposition to the locally heated area, providing a means to terminate the deposition by switching off the microheater. Furthermore, analyte gases can be introduced in the reaction environment, providing performance feedback for the sensors under fabrication. Introducing analyte gases is preferably used for fabricating and testing multiple sensors or sensor arrays in a single production batch. The local temperature control can be used to expand the processing capabilities and the productivity of atomic layer chemical vapor deposition of doped and multi-layered sensing layers inside the pores. For example the microheater can control the temperature during the half-cycles comprising the binary reaction sequences of atomic layer deposition. This, in turn, enables co-deposition of materials that require different deposition temperatures without having to adjust the temperature of the reaction chamber in every cycle. The microheater can also be used to provide post-deposition forming and annealing of sensing materials at required temperatures. After the sensor elements have been produced and packaged, they are calibrated. The calibration is preferably performed with a gas mixture whose composition varies in one of the desired species. The sensor signal value versus the concentration of the varying species is obtained. Such calibration data is then obtained for all species of interest.

The sensors described in the 152 patent may be utilized to determine the composition and presence of vapors, gases and liquid analytes, as well as physical parameters of gases, such as humidity, temperature, flow and pressure. The sensor element or array may be connected in a circuit to prepare a monitor capable of detecting changes in the property of the sensing layer. The sensor may be used as a disposable sensor or as a non-disposable sensor, as a regenerable or non-regenerable sensor, or as a continuous or cumulative sensor. The sensor element or sensor element array is preferably first exposed to the environment whose composition needs to be measured. The sensing mechanism can be based, for example, on resistance, capacitance, inductance, impedance, phase angle, loss factor, dissipation, breakdown voltage, electrical temperature coefficient of an electrical property, Nernst current, impedance associated with ion conducting, open circuit potential, electrochemical property, electronic property, magnetic property, thermal property, mechanical property, or optical property. For example, the impedance value is obtained and interpreted in light of the calibration data. The interpreted impedance then yields the desired composition information.

The sensors and sensor arrays described in the 152 patent have a very broad working temperature range and low thermal mass. This enables operation of the sensors at high temperature and high temperature scan rates, which may be useful in oilfield operations. Operation modes include constant temperature control from ambient temperature to 1200 C, temperature steps, temperature ramp and soak, applying various temperature waveforms, including sine, square, triangular, arbitrary, and combinations of these modes. The operating temperature range may be ambient temperature to 1500° C.

The microheater temperature can be controlled by controlling the applied voltage, current or power. In temperature modulation mode the heater voltage scan rate can be up to and including 100 V/s. In the sensor array operation, maintaining individual sensors with the same or different sensing elements at different temperatures provides a matrix of substantially simultaneous responses that can be used for analyzing complex gas mixtures.

Humidity measurements in the temperature pulse mode preferably include a "heater on" portion of the cycle—also called the desorption cycle—where the sensor is dehydrated to produce a dry sensing layer and/or sensor substrate for subsequent measurement. In the temperature pulse mode, the sensing layer readily adsorbs water during the "heater off" portion of the cycle, which is referred to as "adsorption" cycle. In the "heater on" portion of the cycle, the water molecules are desorbed from the sensing element, providing a reproducible current peak or set of current peaks. Humidity measurements in the temperature pulse mode have improved base line, reproducibility, sensor response time (they are shorter), and detection limits (they are lower), among other measurement characteristics. Other analytes, such as hazardous gases, and physical parameters may be also measured in the temperature pulse mode. The passive mode provides highly sensitive, repeatable performance as well, and may be appropriate for certain applications. A periodic on-board heating mode for the sensors may be implemented by heating the sensor to the temperature from 5° C. above ambient to 500° C. and higher to regenerate the sensor after contamination, wetting or icing.

One of ordinary skill in the art will appreciate that particular sensor designs, sensing element properties, and operating mode are specifically designed to detect particular composition or physical parameter. Therefore, the choice of particular sensor designs and sensing layer properties may be applied for many oilfield applications. Furthermore, the methods discussed above can be utilized to prepare other devices and device arrays useful for photonic sensors, magnetic sensors, thermal sensors, electromagnetic field sensors, piezo sensors, passive electronic components, interconnects, gas storage, energy storage, fuel cells, and other products.

Another set of nanosensors that may be useful in the practice of the invention is described in U.S. Pub. App. No. 20020117659, published Aug. 29, 2002, incorporated herein by reference. A nanowire or nanowires form part of a system constructed and arranged to determine an analyte in a sample to which the nanowire(s) is exposed. "Determine", in this context, means to determine the quantity and/or presence of the analyte in the sample. Presence of the analyte can be determined by determining a change in a characteristic in the nanowire, typically an electrical characteristic or an optical characteristic. For example an analyte causes a detectable change in electrical conductivity of the nanowire or optical properties. In one embodiment, the nanowire includes, inherently, the ability to determine the analyte. The nanowire may be functionalized, i.e. comprising surface functional moieties, to which the analytes binds and induces a measurable property change to the nanowire. The binding events can be specific or non-specific. The functional moieties may include simple groups, selected from the groups including, but not limited to, —OH, —CHO, —COOH, —SO$_3$H, —CN, —NH$_2$, SH, —COSH, COOR, halide; grafted polymer chains with chain length less than the diameter of the nanowire core, selected from a group of polymers including, but not limited to, polyamide, polyester, polyimide, polyacrylic; a thin coating covering the surface of the nanowire core, including, but not limited to, the following groups of materials: metals, semiconductors, and insulators, which may be a metallic element, an oxide, an sulfide, a nitride, a selenide, a polymer and a polymer gel. In another embodiment, the invention provides a nanowire and a reaction entity with which the analyte interacts, positioned in relation to the nanowire such that the analyte can be determined by determining a change in a characteristic of the nanowire. The nanowires may be functionalized at their surface, or in close proximity to their surface. In one particular case, functionalization (e.g., with a reaction entity), either uniformly or non-uniformly, permits interaction of the functionalized nanowire with various entities, such as molecular entities, and the interaction induces a change in a property of the functionalized nanowire, which provides a mechanism for a nanosensor.

Any nanowire can be used, including carbon nanotubes, nanorods, nanowires, organic and inorganic conductive and semiconducting polymers, and the like unless otherwise specified. Other conductive or semiconducting elements that may not be molecular wires, but are of various small nanoscopic-scale dimension, also can be used in some instances, e.g. inorganic structures such as main group and metal atom-based wire-like silicon, transition metal-containing wires, gallium arsenide, gallium nitride, indium phosphide, germanium, cadmium selenide structures. A wide variety of these and other nanowires can be grown on and/or applied to surfaces in patterns useful for electronic devices in a manner similar to techniques described herein involving nanowires, without undue experimentation. The nanowires should be able to be formed of at least one micron, preferably at least three microns, more preferably at least five microns, and more preferably still at least ten or twenty microns in length, and preferably are less than about 100 nanometers, more preferably less than about 75 nanometers, and more preferably less than about 50 nanometers, and more preferably still less than about 25 nanometers in thickness (height and width). The wires should have an aspect ratio (length to thickness) of at least about 2:1, preferably greater than about 10:1, and more preferably greater than about 1000:1. A preferred nanowire for use in devices of the invention can be either a nanotube or a nanowire. Nanotubes (e.g. carbon nanotubes) are hollow. Nanowires (e.g. silicon nanowires) are solid.

Whether nanotubes or nanowires are selected, the criteria for selection of nanowires and other conductors or semiconductors for use in the invention are based, in some instances, mainly upon whether the nanowire itself is able to interact with an analyte, or whether the appropriate reaction entity, e.g. binding partner, can be easily attached to the surface of the nanowire, or the appropriate reaction entity, e.g. binding partner, is near the surface of the nanowire. Selection of suitable conductors or semiconductors, including nanowires, will be apparent and readily reproducible by those of ordinary skill in the art with the benefit of the present disclosure.

Nanotubes that may be used in the present invention include single-walled nanotubes (SWNTs) that exhibit unique electronic, and chemical properties that are particularly suitable for molecular electronics. Structurally, SWNTs are formed of a single graphene sheet rolled into a seamless tube with a diameter on the order of about 0.5 nm to about 5 nm and a length that can exceed about 10 microns. Depending on diameter and helicity, SWNTs can behave as one-dimensional metals or semiconductor and are currently available as a mixture of metallic and semiconducting nanotubes. Methods of manufacture of nanotubes, including SWNTs, and characterization are known. Methods of selective functionalization on the ends and/or sides of nanotubes also are known, and the present invention makes use of these capabilities for molecular electronics. The basic structural/electronic properties of nanotubes can be used to create connections or input/output signals, and nanotubes have a size consistent with molecular scale architecture.

Individual nanowires may be used. As used herein, "individual nanowires" means a nanowire free of contact with another nanowire (but not excluding contact of a type that may be desired between individual nanowires in a crossbar array). For example, typical individual nanowire can have a thickness as small as about 0.5 nm. Nanowire ropes may also be used.

Using one or more production techniques discussed in this reference, elongated nanoscale semiconductors, including semiconductor nanowires and doped semiconductor nanowires, can be grown. Such bulk-doped semiconductors may include various combinations of materials, including semiconductors and dopants. The following are non-comprehensive lists of such materials. Other materials may be used. Such materials include, but are not limited to:

Elemental semiconductors:
Si, Ge, Sn, Se, Te, B, Diamond, P
Solid solution of Elemental semiconductors:
B—C, B—P(BP6), B—Si, Si—C, Si—Ge, Si—Sn, Ge—Sn
IV-IV group semiconductors:
SiC
III-V semiconductors:
BN/BP/BAs, AlN/AlP/AlAs/AlSb, GaN/GaP/GaAs/GaSb, InN/InP/InAs/InSb,
Alloys of III-V Group:
any combination of two or more of the above compound (e.g.: AlGaN, GaPAs, InPAs, GaInN, AlGaInN, GaIn AsP . . . )
I-VI semiconductors:
ZnO/ZnS/ZnSe/ZnTe, CdS/CdSe/CdTe, HgS/HgSe/HgTe, BeS/BeSe/BeTe/MgS/MgSe
Alloys of II-VI Group: any combination of two or more of the above compound (e.g.: (ZnCd)Se, Zn(SSe) . . . )
Alloy of II-VI and III-V semiconductors:
combination of any one II-VT and one III-V compounds, e.g. $(GaAs)_x(ZnS)_{1-x}$
IV-VI semiconductors:
GeS, GeSe, GcTe, SnS, SnSe, SnTe, PbO, PbS, PbSe, PbTe
I-VII semiconductors:
CuF, CuCl, CuBr, CuI, AgF, AgCl, AgBr, AgI
Other semiconductor compounds:
II-IV-V$_2$: BeSiN$_2$, CaCN$_2$, ZnGeP$_2$, CdSnAs$_2$, ZnSn Sb$_2$ . . .
I-IV$_2$-V$_3$: CuGeP$_3$, CuSi$_2$P$_3$ . . .
(I-III-VI$_2$: Cu, Ag)(Al, Ga, In, Tl, Fe)(S, Se, Te)$_2$
IV$_3$-V$_4$: Si$_3$N$_4$, Ge$_3$N$_4$ . . .
III$_2$-VI$_3$: Al$_2$O$_3$, (Al, Ga, In)$_2$(S, Se, Te)$_3$ . . .
III$_2$-IV-VI: Al$_2$CO . . .

For Group IV semiconductor materials, a p-type dopant may be selected from Group III, and an n-type dopant may be selected from Group V. For silicon semiconductor materials, a p-type dopant may be selected from the group consisting of B, Al and In, and an n-type dopant may be selected from the group consisting of P, As and Sb. For Group III-V semiconductor materials, a p-type dopant may be selected from Group II, including Mg, Zn, Cd and Hg, or Group IV, including C and Si. An n-type dopant may be selected from the group consisting of Si, Ge, Sn, S, Se and Te. It will be understood that the invention is not limited to these dopants.

"Elastomer" as used herein is a generic term for natural rubber and man-made substances emulating natural rubber in that they stretch under tension, have a high tensile strength, retract rapidly, and substantially recover their original dimensions. The term includes thermoplastic elastomers and non-thermoplastic elastomers. The term includes blends (physical mixtures) of elastomers, as well as copolymers, terpolymers, and multi-polymers.

Swellable elastomers useful in the swellable elastomeric compositions include ethylene-propylene-diene polymer (EPDM), various nitrile rubbers which are copolymers of butadiene and acrylonitrile such as Buna-N (also known as standard nitrile and NBR). By varying the acrylonitrile content, elastomers with improved oil/fuel swell or with improved low-temperature performance can be achieved. Specialty versions of carboxylated high-acrylonitrile butadiene copolymers (XNBR) provide improved abrasion resistance, and hydrogenated versions of these copolymers (HNBR) provide improve chemical and ozone resistance elastomers. Carboxylated HNBR is also known. Other useful elastomers include polyvinylchloride-nitrile butadiene (PVC-NBR) blends, chlorinated polyethylene (CM), chlorinated sulfonate polyethylene (CSM), aliphatic polyesters with chlorinated side chains such as epichlorohydrin homopolymer (CO), epichlorohydrin copolymer (ECO), and epichlorohydrin terpolymer (GECO), polyacrylate rubbers such as ethylene-acrylate copolymer (ACM), ethylene-acrylate terpolymers (AEM), EPR, elastomers of ethylene and propylene, sometimes with a third monomer, such as ethylene-propylene copolymer (EPM), ethylene vinyl acetate copolymers (EVM), fluorocarbon polymers (FKM), copolymers of poly(vinylidene fluoride) and hexafluoropropylene (VF2/HFP), terpolymers of poly(vinylidene fluoride), hexafluoropropylene, and tetrafluoroethylene (VF2/HFP/TFE), terpolymers of poly(vinylidene fluoride), polyvinyl methyl ether and tetrafluoroethylene (VF2/PVME/TFE), terpolymers of poly(vinylidene fluoride), hexafluoropropylene, and tetrafluoroethylene (VF2/HPF/TFE), terpolymers of poly (vinylidene fluoride), tetrafluoroethylene, and propylene (VF2/TFE/P), perfluoroelastomers such as tetrafluoroethylene perfluoroelastomers (FFKM), highly fluorinated elastomers (FEPM), butadiene rubber (BR), polychloroprene rubber (CR), polyisoprene rubber (IR), polynorbornenes, polysulfide rubbers (OT and EOT), polyurethanes (AU) and (EU), silicone rubbers (MQ), vinyl silicone rubbers (VMQ), fluoromethyl silicone rubber (FMQ), fluorovinyl silicone rubbers (FVMQ), phenylmethyl silicone rubbers (PMQ), styrene-butadiene rubbers (SBR), copolymers of isobutylene and isoprene known as butyl rubbers (IIR), brominated copolymers of isobutylene and isoprene (BIIR) and chlorinated copolymers of isobutylene and isoprene (CIIR).

Suitable examples of useable fluoroelastomers are copolymers of vinylidene fluoride and hexafluoropropylene and terpolymers of vinylidene fluoride, hexafluoropropylene and tetrafluoroethylene. The fluoroelastomers suitable for use in the disclosed invention are elastomers that comprise one or more vinylidene fluoride units ($VF_2$ or VdF), one or more hexafluoropropylene units (HFP), one or more tetrafluoroethylene units (TFE), one or more chlorotrifluoroethylene (CTFE) units, and/or one or more perfluoro(alkyl vinyl ether) units (PAVE) such as perfluoro(methyl vinyl ether)(PMVE), perfluoro(ethyl vinyl ether)(PEYE), and perfluoro(propyl vinyl ether)(PPVE). These elastomers can be homopolymers or copolymers. Particularly suitable are fluoroelastomers containing vinylidene fluoride units, hexafluoropropylene units, and, optionally, tetrafluoroethylene units and fluoroelastomers containing vinylidene fluoride units, perfluoroalkyl perfluorovinyl ether units, and tetrafluoroethylene units, such as the vinylidene fluoride type fluoroelastomer known under the trade designation AFLAS®, available from Asahi Glass Co., Ltd. Especially suitable are copolymers of vinylidene fluoride and hexafluoropropylene units. If the fluoropolymers contain vinylidene fluoride units, the polymers may contain up to 40 mole % $VF_2$ units, e.g., 30-40 mole %. If the fluoropolymers contain hexafluoropropylene units, the polymers may contain up to 70 mole % HFP units. If The fluoropolymers contain tetrafluoroethylene units, the polymers may contain up to 10 mole % TFE units. When the fluoropolymers contain chlorotrifluoroethylene the polymers may contain up to 10 mole % CTFE units. When the fluoropolymers contain perfluoro(methyl vinyl ether) units, the polymers may contain up to 5 mole % PMVE units. When the fluoropolymers contain perfluoro(ethyl vinyl ether) units, the polymers may contain up to 5 mole % PEVE units. When the fluoropolymers contain perfluoropropyl vinyl ether) units, the polymers may contain up to 5 mole % PPVE units. The fluoropolymers may contain 66%-70% fluorine. One suitable commercially available fluoroelastomer is that known under the trade designation TECHNOFLON FOR HS® sold by Ausimont USA. This material contains Bisphenol AF, manufactured by Halocarbon Products Corp. Another commercially available fluoroelastomer is known under the trade designation VITON® AL 200, by DuPont Dow, which is a terpolymer of $VF_2$, HFP, and TFE monomers containing 67% fluorine. Another suitable commercially available fluoroelastomer is VITON® AL 300, by DuPont Dow. A blend of the terpolymers known under the trade designations VITON® AL 300 and VITON® AL 600 can also be used (e.g., one-third AL-600 and two-thirds AL-300). Other useful elastomers include products known under the trade designations 7182B and 7182D from Seals Eastern, Red Bank, N.J.; the product known under the trade designation FL80-4 available from Oil States Industries, Inc., Arlington, Tex.; and the product known under the trade designation DMS005 available from Duromould, Ltd., Londonderry, Northern Ireland.

Commercially available thermoplastic elastomers include segmented polyester thermoplastic elastomers, segmented polyurethane thermoplastic elastomers, segmented polyamide thermoplastic elastomers, blends of thermoplastic elastomers and thermoplastic polymers, and ionomeric thermoplastic elastomers.

As used herein the phrases "swellable in water", "water-swellable", "water swellability" and the like are used interchangeably and mean that the elastomeric composition swells at least up to 25 percent, in some embodiments up to 100 percent, and in some embodiments up to 200 percent of their original volume after soaking in tap water at 100° C. for 24 hours. Similarly, the phrases "swellable in oil", "oil-swellable", "oil swellability" and the like are used interchangeably and mean that the elastomeric composition swells at least up to 25 percent, in some embodiments up to 100 percent, and in some embodiments up to 200 percent of their original volume after soaking in kerosene at 100° C. for 24 hours. Therefore, a "swellable elastomer" may either be water-swellable, oil-swellable, or both. Although the rate of swelling may be hours in some embodiments, in certain embodiments the rate of swelling may be measured in minutes. The rate of swelling is defined as the amount of time required for the swelled composition to reach an equilibrium state, where swelling has ceased. Unsaturated organic acids may be employed as grafting agents, and in some embodiments both as grafting agents and additives, along with other ingredients, to make commercial elastomers variably water-swellable, oil- and water-swellable, swellable in low pH and high-salinity brines, and/or high-temperature swellable by using commercially available materials, making the elastomeric compositions exemplary for use in a variety of oilfield applications. In certain embodiments the elastomer formulations may exhibit self-healing properties, making their use in self-healing, swellable seals possible.

It is not expected that the nanosensors described herein will adversely impact the swellability features of the elastomers, as their presence in the swellable elastomer need not be extremely high in order to serve their sensing function. The upper limit on amount or number of nanosensors in the swellable elastomer depends upon the oilfield element and oilfield assembly into which the swellable elastomeric composition is placed, as well as the expected operating conditions (temperature, pressure, chemical environment, and the like). Without being limited to any specific upper limit, it is believed that nanosensors may be present in the swellable elastomer up to about 20 parts per hundred parts of elastomer, but higher or lower amounts may be dictated at least by the above-mentioned factors.

Swellable elastomers disclosed herein may be used for sealing applications in oilfield industry especially for applications such as swellable elastomeric packers, zonal isolation tools, flow control, sand control, coil tubing slack management, and other uses. These materials may also be used as self-healing seals for downhole applications. One major advantage of some of the swellable elastomers disclosed herein, except the high-salinity swellable elastomers and the high-temperature swellable elastomers are, at least presently, relatively low cost, commercially available materials. Swellable elastomeric compositions useful in oilfield elements of the invention may be readily made in small or large quantities by using standard elastomer manufacturing techniques such as Banbury and two roll mill compounding.

Co-pending application Ser. No. 11/308,448, filed Mar. 27, 2006, issued May 20, 2008 as U.S. Pat. No. 7,373,991, is incorporated herein by reference, describes in flow-sheet fashion how to make some embodiments of elastomeric compositions useful in apparatus of the invention. For example, EPDM, natural rubber, polybutadiene, polyisoprene, ethylene-octene based rubber and other linear or branched ethylene olefin-based elastomers having residual unsaturation may be made swellable in water to varying degrees. One process involves grafting an unsaturated organic acid molecule. A common example of an unsaturated organic acid used for this purpose is maleic acid. Other molecules that can be used include mono- and di-sodium salts of maleic acid and potassium salts of maleic acid. Although in principle other unsaturated carboxylic acids may also be grafted onto commercial unsaturated elastomers, acids that exist in solid form may not require additional steps or manipulation, as will be readily apparent to those having reasonable skill in the chemical art. Mixing other unsaturated acids such as acrylic acid and methacrylic acid is also possible but may be more difficult since they are liquids at room temperature. Unsaturated acids such as palmitoleic acid, oleic acid, linoleic acid, and linolenic acid may also be used. The initial reaction leads to a relatively non-porous "acid-grafted rubber." In order to enhance the swelling of elastomers, addition of a small amount of alkali such as soda ash, along with or separate from the unsaturated acid, leads to formation of a porous, swellable acid grafted rubber. Micro-porosities are formed in the composition, allowing the water to rapidly reach the interior region of a molded part and increase the rate and extent of swelling. An organic peroxide vulcanizing agent may be employed to produce a vulcanized, porous, swellable acid-grafted rubber formulation. In one embodiment, 100 phr of EPDM, 5-100 phr of maleic acid, 5-50 phr of sodium carbonate, and 1-10 phr of dicumyl peroxide as vulcanizing agent showed at least 150 percent swelling of elastomer when exposed to both water at 100° C. for 24 hrs and at room temperature for 24 hrs in kerosene. Other commercially available grades of organic peroxides, as well as other vulcanization agents, may be employed. The resulting elastomeric compositions may be described as non-porous, or porous and swelled, acid-grafted rubbers, which may or may not be vulcanized. The terms "vulcanized" and "crosslinked" are used interchangeably herein, although vulcanization technically refers to a physicochemical change resulting from crosslinking of the unsaturated hydrocarbon chain of polyisoprene with sulfur, usually with the application of heat. The relatively hydrophobic linear or branched chain polymers and relatively hydrophilic water-soluble monomers, either grafted onto the polymer backbone or blended therein, may act together to cost-effectively increase the water- and/or oil-swellability of oilfield elements that comprise one or more apparatus of the invention. In particular, the use of unsaturated organic acids, anhydrides, and their salts (for example maleic acid, maleic anhydride, and theirs salts), offer a commercially feasible way to develop inexpensive composites materials with good water- and brine-swellability, and optionally hydrocarbon fluid swellability, depending on the type of inorganic additives and monomers used Elastomers such as nitrile, HNBR, fluoroelastomers, or acrylate-based elastomers, or their precursors, if added in variable amounts to an EPDM polymer or its precursor monomer mixture, along with a sufficient amount (from about 1 to 10 phr) of an unsaturated organic acid, anhydride, or salt thereof, such as maleic acid, optionally combined with a sufficient amount (from 1 about to 10 phr) an inorganic swelling agent such as sodium carbonate, may produce a water-swellable elastomer having variable low-oil swellability. Addition to the monomer mixture, or to the elastomer after polymerization, of a sufficient amount (from about 0.5 to 5 phr) of a highly acidic unsaturated compound such as 2-acrylamido-2-methylpropane sulfonic acid (AMPS), results in a water-swellable elastomer having variable oil-swellability, and which is further swellable in low pH fluids such as completion fluids containing zinc bromide. A second addition of a sufficient amount (from 1 to 10 phr more than the original addition) of inorganic swelling agent enhances swellability in low pH, high concentration brines. Finally, the addition of a sufficient amount (from 1 to 20 phr) of zwitterionic polymer or copolymer of a zwitterionic monomer with an unsaturated monomer, results in a cross-linked elastomer. The amounts of the various ingredients at each stage may be varied as suited for the particular purpose at hand. For example, if one simply wishes to produce a highly cross-linked, moderately water-swellable (about 100 percent swell) elastomer having very low oil-swellability but very high swellability in low pH fluids, one would use a recipe of 60 to 80 phr of EPDM, and 20 to 40 phr of nitrile or HNBR, and 4 to 5 phr of AMPS, as well as about 15 to 20 phr of a zwitterionic polymer or monomer.

Another reaction scheme useful in the present invention, enabling a low-cost procedure for making high-temperature swellable elastomers, involves the use of AMPS monomer and like sulfonic acid monomers. Since AMPS monomer is chemically stable up to at least 350° F. (177° C.), mixtures of EPDM and AMPS monomer which may or may not be grafted on to EPDM will function as a high-temperature resistant water-swellable elastomer. The use of AMPS and like monomers maybe used in like fashion to functionalize any commercial elastomer to make a high-temperature water-swellable elastomer. An advantage of using AMPS is that it is routinely used in oilfield industry in loss circulation fluids and is very resistant to down hole chemicals and environments.

A self-heating elastomer useful in the invention may be made by blending EPDM with maleic acid. This elastomer exhibits some degree of self-healing capability when exposed to water at 100° C. for 24 hrs. EPDM/maleic acid blend produces an elastomer which shows that a cut introduced in an elastomer specimen heals due to the swelling and flow of the elastomer at elevated temperature. The healing of elastomer may not give a bond with high strength since the bonding is not due to chemical crosslinking, however it may have sufficient strength to create a seal. One example of potential application is for sealing the communication line in a wellbore when it passes through a packer elastomeric element.

As used herein the term "reaction product" means that some or all of the ethylenically unsaturated positions of the polymer, whether pendant, in-chain, or both, are addition polymerized with the ethylenically unsaturated portion of an organic monomer having the mentioned acid, anhydride, or acid salt moiety. The linear or branched polymer having residual ethylenic unsaturation functions as the main structural component of the elastomer, and, depending on its length, solubility parameter, and other factors, largely determines the oil-swellability of the composition and therefore the oil-swellability of the oilfield element. A non-limiting example is terpolymers of ethylene-propylenedicne monomer (EPDM), wherein the diene monomer may be selected from a number of non-conjugated dienes. Other examples of linear or branched chain polymers having residual ethylenic unsaturation include natural rubber, polybutadiene, polyisoprene, ethylene-octene-based rubber and the like. Both cis and trans versions, as well as derivatized versions (side chains) of any of these may be used, as long as they do not affect the basic swellability properties sought in the final product elastomeric composition.

By varying the linear or branched polymer having residual ethylenic unsaturation (sometimes referred to herein as the base elastomer), the degree of swelling in hydrocarbon oil may be varied. As a result, if base elastomers like nitrile or HNBR, or other oil-swell resistant polymers are employed, with maleic acid alone or maleic acid/sodium carbonate mixture, then the elastomer becomes water-swellable but exhibits very low swell in hydrocarbon oils. The base elastomer may vary from 1 to 100 percent of an oil-swell resistant polymer.

The base elastomer may include a zwitterionic polymer blended into the base elastomer, or a copolymer of zwitterionic monomers and unsaturated monomers like butadiene and isoprene, allowing production of a crosslinkable elastomer that swells in high salinity brines as well as in hydrocarbon oil-based fluids. A diene monomer may be included for crosslinking cites. Representative zwitterionic polymers useful in the invention include, but are not limited to, copolymers of 2-methacryloyloxyethyl-2'-trimethylammonium ethyl phosphate inner salt (MPC) with comonomers, including a variety of hydrophobic monomers, for instance $C_{4-18}$-alkyl methacrylate, and fluoroalkyl methacrylates.

The swellable elastomeric composition may comprise a high temperature swellable elastomeric composition comprising a physical mixture or blend of a linear or branched polymer having residual ethylenic unsaturation with a low cost, highly acidic unsaturated monomer. A first portion of the low cost, highly acidic unsaturated monomer may be grafted onto the linear or branched polymer having residual ethylenic unsaturation, while a second portion may remain in physical mixture with the elastomer. These compositions function as a high temperature resistant swellable elastomer. The use of AMPS monomer has an advantage in the in that it is routinely used in oilfield industry in loss circulation fluids and is very resistant to down hole chemicals and environments.

The swellable elastomeric composition may comprise a high temperature swellable elastomeric composition comprising a physical blend of a linear or branched polymer having residual ethylenic unsaturation and ethylenically unsaturated organic monomer having at least one reactive moiety selected from acid, acid anhydride, and acid salt. Elastomeric blends of EPDM and an unsaturated organic acid, for example maleic acid, exhibit some degree of self-healing capability when exposed to water at 100° C. for 24 hrs.

More complex polymer substrates, often designated as interpolymers, may be prepared using a third component. The third component, if used, may be a polyene monomer selected from non-conjugated dienes and trienes. The non-conjugated diene component may have from 5 to 14 carbon atoms in the chain. Preferably, the diene monomer is characterized by the presence of a vinyl group in its structure and can include cyclic and bi-cyclo compounds. A mixture of more than one diene, more than one triene, or mixture of dienes and trienes may be used.

Representative dienes include, but are not limited to, non-conjugated dienes such as dicyclopentadiene, 5-ethylidene-2-norbornene, 5-methylene-2-norbornene 1,4-hexadiene, 1,4-cyclohexadiene, 1,5-heptadiene, and 1,6-octadiene.

The triene component, if used, will have at least two non-conjugated double bonds, and may have up to about 30 carbon atoms in the chain. Typical trienes useful in preparing elastomers useful in the invention include, but are not limited to, 1-isopropylidene-3a,4,7,7a-tetrahydroindene, 1-isopropylidenedicyclopentadiene, dehydro-isodicyclopenta-diene, and 2-(2-methylene-4-methyl-3-pentenyl)-2.2.1-bicyclo-5-heptene.

The ethylenically unsaturated organic monomer having at least one reactive moiety selected from acid, acid anhydride, and acid salt functions mainly as a means to attach (graft) and/or blend in hydrophilic cites and lend water-swellability to the elastomer. A secondary function is to provide crosslinking cites, if the monomer comprises more than one ethylenically unsaturated moiety. Maleic acid is a non-limiting example of this component. In these embodiments, one of the unsaturated moieties may react with one unsaturation position on one chain, and the other unsaturated moiety may react with another polymer, in this way forming a 3-dimensional network. Alternatively, two (or more) unsaturated moieties in a monomer molecule may react with different unsaturation points of the same polymer chain.

The ethylenically unsaturated organic monomer having at least one reactive moiety selected from acid, acid anhydride, and acid salt may comprise a low cost, highly acidic unsaturated monomer, or such a monomer may be added to the polymerized elastomer. Such a monomer copolymerized with or simply added to EPDM, nitrile, or HNBR results in an elastomer that swells in low pH fluids such as completion fluids comprising zinc bromide. An example is 2-acrylamido-2-methylpropane sulfonic acid (AMPS), but the invention is not so limited.

The ethylenically unsaturated organic monomer has, or may be changed to have, carboxylic function, and may in certain embodiments comprise alpha- or beta-unsaturated ($C_4$-$C_{10}$) dicarboxylic acid, or anhydride or ester thereof, or monocarboxylic acid.

Examples of ethylenically unsaturated organic monomers having at least one reactive moiety selected from acid, acid anhydride, and acid salts include unsaturated mono- and dicarboxylic acids such as acrylic acid, methacrylic acid, crotonic acid, cinnamic acid, maleic acid, oleic acid, linoleic acid, linolenic acid, palmitoleic acid, fumaric acid, itaconic acid, maleic anhydride, chloromaleic acid, dimethylfumarte, chloromaleic anhydride and the like, as well as mixtures thereof.

The swellable elastomeric composition may comprise any number of additives, filters, and the like, depending on the end use of the oilfield element, as long as the desired function of the nanosensor(s) is(are) not significantly adversely affected. One such additive is an inorganic swelling agent, which functions to enhance the water-swellability of the elastomeric compositions useful in the invention.

Inorganic swelling agents useful for this purpose include alkali- and alkaline earth carbonates, such as carbonates of sodium (sodium carbonate; soda ash), potassium, lithium, beryllium, calcium, strontium magnesium, and the like, and combinations thereof. Without being limited thereby, it is believed that these materials contribute porosity to the elastomer when added in amounts up to about 5 parts per hundred weight of composition.

Apparatus in accordance with the invention include those wherein the swellable elastomeric composition is vulcanized by an organic vulcanizing agent. An inorganic vulcanization agent may be included, such as one or more inorganic metallic oxides, and certain metals such as selenium. Heat, high energy radiation, chemical accelerators and other means may be used in conjunction with the organic vulcanization agent.

Examples of organic vulcanization elements useful in the invention may be selected from organic peroxides, such as dicumyl peroxide, tert-butyl cumyl peroxide, di-tert-butyl-peroxide, di(tert-butylperoxyisopropyl)benzene, dibenzoyl peroxide, di(2,4-dichlorobenzoyl)peroxide, di(4-methylbenzoyl)peroxide, 2,5-Dimethyl-2,5-di(tert-butylperoxy)hexane, 2,5-dimethyl-2,5-di(tert-butylperoxy)hexyne, butyl 4,4-di(tert-butylperoxy)valerate, 1,1-di(tert-butylperoxy)-3,3,5-trimethylcyclohexane, tert-butyl peroxy-3,5,5-trimethylhexanoate, tert-butyl peroxybenzoate, and the like, and mixtures thereof. Various grades of these organic peroxides are available from AKZO NOBEL NV under the trade designations PERKADOX and TRIGONOX.

Halogenated quinones may be used as organic vulcanization elements, including those such as chlorinated quinones such as chloranil and 2,3-dichloro-5,6-dicyanoquinone, and the like, and mixtures thereof.

Nitrobenzenes, nitrotoluenes, nitroxylenes, and ortho-, meta-, and para-derivatives thereof may be used as organic vulcanization elements. Useful p-nitrobenzene derivatives include, but are not limited to, for example, p-nitrofluorobenzene, p-nitrochlorobenzene, p-nitrobromobenzene, p-nitroiodobenzene, p-nitrophenol, p-nitrobenzoic acid, and p-nitrobenzoic acid chloride. Other useful nitrobenzene derivatives include 2-methyl-4-nitrophenol, 2-trifluoromethyl-4-nitrophenol, 2-methyl-4-nitrobenzoic acid, 2-methyl-4-nitrobenzoic acid chloride, 2-trifluoromethyl-4-nitrobenzoic acid, 2-trifluoromethyl-4-nitrobenzoic acid chloride or acetanilide. A combination thereof may be suitably selected depending upon the particular purpose taking into consideration the reactivity and the availability of the materials. It should be mentioned that those exemplified here are only examples.

The ethylenically unsaturated organic monomer having at least one reactive moiety selected from acid, acid anhydride, and acid salt may comprise a highly acidic unsaturated organic monomer, or such a monomer may be added to the polymerized elastomer. Such a monomer copolymerized with or simply added to EPDM, nitrile, or HNBR results in an elastomer that swells in low pH fluids such as completion fluids comprising zinc bromide. Example of useful highly acidic unsaturated monomers include, but are not limited to, sulfonic acids such as 2-acrylamido-2-methylpropane sulfonic acid (AMPS); 2-allyloxy-2-hydroxy-1-propane sulfonic acid; and vinylsulfonic acid. Addition of an inorganic swelling agent, such as the alkali- and alkaline earth carbonates mentioned above, may further enhance elastomer swelling in low pH fluids and high concentration brines.

The base elastomer may include a zwitterionic polymer blended into the base elastomer, or a copolymer of zwitterionic monomers and unsaturated monomers like butadiene and isoprene, allowing production of a crosslinkable elastomer that swells in high salinity brines as well as in hydrocarbon oil-based fluids. A diene monomer may be included for crosslinking cites. "Zwitterionic monomer" means a polymerizable molecule containing cationic and anionic (charged) functionality in equal proportions, so that the molecule is net neutral overall. "Zwitterionic polymer" means a polymer composed from zwitterionic monomers and, possibly, other non-ionic monomer(s). Representative zwitterionic monomers include, but are not limited to:

N,N-dimethyl-N-acryloyloxyethyl-N-(3-sulfopropyl)-ammonium betaine,
N,N-dimethyl-N-acrylamidopropyl-N-(2-carboxymethyl)-ammonium betaine,
N,N-dimethyl-N-acrylamidopropyl-N-(3-sulfopropyl)-ammonium betaine,
N,N-dimethyl-N-acrylamidopropyl-N-(2-carboxymethyl)-ammonium betaine,
2-(methylthio)ethyl methacryloyl-S-(sulfopropyl)-sulfonium betaine,
2-[(2-acryloylethyl)dimethylammonio]ethyl 2-methyl phosphate,
2-(acryloyloxyethyl)-2'-(trimethylammonium)ethyl phosphate,
[(2-acryloylethyl)dimethylammonio]methyl phosphonic acid,
2-methacryloyloxyethyl phosphorylcholine,
2-[(3-acrylamidopropyl)dimethylammonio]ethyl 2'-isopropyl phosphate),
1-vinyl-3-(3-sulfopropyl)imidazolium hydroxide,
(2-acryloxyethyl)carboxymethyl methylsulfonium chloride,
1-(3-sulfopropyl)-2-vinylpyridinium betaine,
N-(4-sulfobutyl)-N-methyl-N,N-diallylamine ammonium betaine,
N,N-diallyl-N-methyl-N-(2-sulfoethyl) ammonium betaine, and the like.

Representative zwitterionic polymers useful in the invention include, but are not limited to, copolymers of 2-methacryloyloxyethyl-2'-trimethylammonium ethyl phosphate inner salt (MPC) with comonomers, including a variety of hydrophobic monomers, for instance $C_{4-18}$-alkyl methacrylate, and fluoroalkyl methacrylates.

It is well known in rubber industry that the use of fillers may reduce the swelling and permeability of polymeric materials. In general, the reduction in swelling and permeability increases as the filler concentration is increased. The permeability of polymeric materials may also depend on the shape and aspect ratio of the filler particles. Platelet like fillers such as nanoclays, preferably with small thickness (<0.1 micrometer) and length less than 200 micrometers, when aligned, may create a torturous path for diffusing fluid molecules and therefore may enhance the barrier properties of the resultant materials compared with barrier properties of raw polymer of the same composition and morphology. Inorganic or organic fillers that do not significantly adversely affect swell properties of the elastomer or the operation of nanosensors may be used. Inorganic fillers are also known as mineral fillers. A filler is defined as a particulate material, typically having a particle size less than about 100 micrometers, preferably less than about 50 micrometers, but larger than about 1 micrometer. Examples of useful fillers for applications of the present invention include carbon black, calcium carbonate, silica, calcium metasilicate, cryolite, phenolic fillers, or polyvinyl alcohol fillers. Typically, a filler would not be used in an amount greater than about 20 percent based on the weight of the elastomeric composition.

Relatively non-elastic polymeric materials (relative to elastomers), such as thermoplastic and thermoset polymeric materials, may be combined or mixed with the elastomers, at a weight of from about 1 to 40 phr of the elastomer composition. Relatively non-elastic polymeric materials useful in the invention may be selected from natural and synthetic polymers, blends of natural and synthetic polymers, and layered versions of polymers, wherein individual layers may be the same or different in composition and thickness. The non-elastic polymer may comprise one or more thermoplastic polymers and/or one or more thermoset and/or thermally cured polymers, and combinations thereof.

A thermoplastic material is defined as a polymeric material (preferably, an organic polymeric material) that softens and melts when exposed to elevated temperatures and generally returns to its original condition, i.e., its original physical state, when cooled to ambient temperatures. During the manufacturing process of an oilfield element, the thermoplastic material may be heated above its softening temperature, and preferably above its melting temperature, to cause it to flow and form the desired shape of the oilfield element in conjunction with the elastomer. After the desired shape is formed, the thermoplastic substrate is cooled and solidified. In this way, thermoplastic materials (including thermoplastic elastomers) can be molded into various shapes and sizes.

Moldable thermoplastic materials that may be used are those having a high melting temperature, good heat resistant properties, and good toughness properties such that the oilfield element or assemblies containing these materials operably withstand oilfield conditions without substantially deforming or disintegrating.

Besides the elastomeric and optional relatively non-elastic polymeric materials, swellable elastomeric compositions useful in the invention may include an effective amount of a fibrous reinforcing material. Herein, an "effective amount" of a fibrous reinforcing material is a sufficient amount to impart at least improvement in the physical characteristics of the oilfield element, i.e., heat resistance, toughness, flexibility, stiffness, shape control, adhesion, etc., but not so much fibrous reinforcing material as to give rise to any significant number of voids and detrimentally affect the structural integrity of the oilfield element or interfere with operation of the nanosensors elements. The amount of the fibrous reinforcing material may be any amount that does not substantially detrimentally affect the desired swell properties of the composition or the properties of the nanosensors used, and may be within a range of about 1-40 parts, or within a range of about 5-35 parts, or within a range of about 15-30 parts by weight, for every 100 parts by weight of polymer. The fibrous reinforcing material may be in the form of individual fibers or fibrous strands, or in the form of a fiber mat or web. The mat or web can be either in a woven or nonwoven matrix form. Examples of useful reinforcing fibers in applications of the present invention include metallic fibers or nonmetallic fibers. The nonmetallic fibers include glass fibers, carbon fibers, mineral fibers, synthetic or natural fibers formed of heat resistant organic materials, or fibers made from ceramic materials.

Other useful materials or components that may be added to the elastomeric compositions for certain applications of the present invention include, but are not limited to, oils, antistatic agents, flame retardants, heat stabilizers, ultraviolet stabilizers, internal lubricants, antioxidants, and processing aids. One would not typically use more of these components than needed for desired results, keeping in mind the desired swell characteristics of the elastomeric composition and operation of the nanosensor selected.

The elastomeric composition may include a shape stabilizer, i.e., a thermoplastic polymer with a melting point higher than that described above for the thermoplastic material. Suitable shape stabilizers include, but are not limited to, poly (phenylene sulfide), polyimides, and polyaramids. An example of a preferred shape stabilizer is polyphenylene oxide nylon blend commercially available from GE Plastics, Pittsfield, Mass., under the trade designation "NORYL GTX 910."

An "oilfield assembly", as used herein, is the complete set or suite of oilfield elements that may be used in a particular job. All oilfield elements in an oilfield assembly may or may not be interconnected, and some may be interchangeable.

An "oilfield element" includes, but is not limited to one or more items or assemblies selected from zonal isolation tool elastomeric elements, packer elements, blow out preventer elements, O-rings, T-rings, electric submersible pump protectors, centralizers, hangers, plugs, plug catchers, check valves, universal valves, spotting valves, differential valves, circulation valves, equalizing valves, safety valves, fluid flow control valves, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, and the like.

Figure 2:
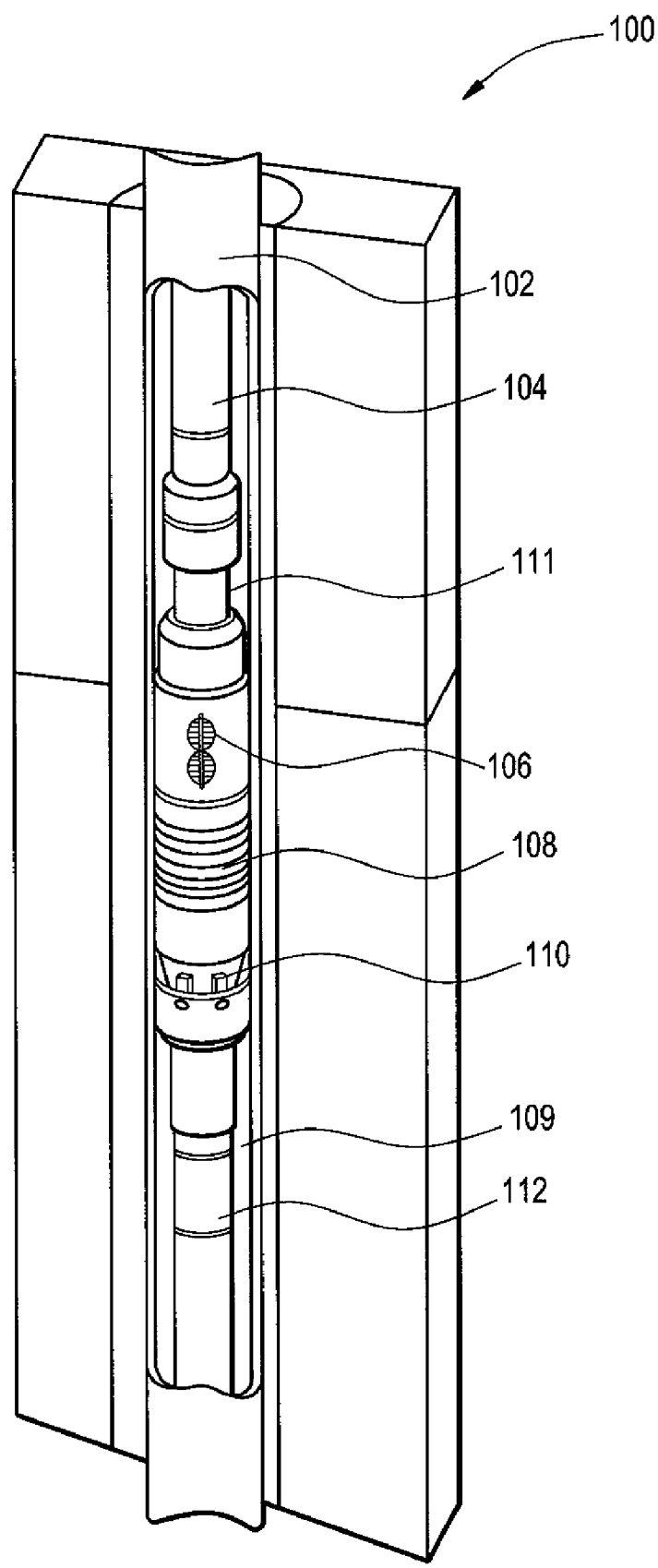
FIG. 2 is a schematic side elevation view, partially in cross-section, of a packer having packer elements comprising a swellable elastomeric composition comprising nanosensors in accordance with the invention.

FIGS. 1-3 illustrate several oilfield assemblies having one or more oilfield elements that may benefit from use of swellable elastomeric compositions comprising one or more nanosensors as described herein. It will be understood that not all of the described oilfield assemblies that may comprise a swellable elastomeric composition and nanosensor need be the same in composition or nanosensor; indeed, not all of the possible oilfield elements need have elastomeric components or nanosensors. In some embodiments, perhaps only the wellbore conformal elements of a packer, for example, may be comprised of a swellable elastomeric composition including nanosensors. Further, when an oilfield element is mentioned as being comprised of a swellable elastomeric composition including nanosensors, the composition may itself be a component of a larger structure, for example placed onto or adjacent another material, for example a metallic component.

A completion assembly of the invention 10 comprising a zonal isolation tool 12 is illustrated in FIGS. 1A and 1B for allowing production of two separate flows 4A and 4B from an open hole 3. Assembly 10 may include a production packer 14, a gravel pack packer 16, flow control valves 18, and other components commonly used in downhole completions.

Zonal isolation tool 12 may comprise a packer 20, a pair of anchors 22, a pair of polished bore receptacles (PBRs) 24, and an expansion joint 26. Service tools may include a setting string 28 and an isolation string 30. Any one or all of packer 20, anchors 22, production packer 14, and gravel pack packer 16 may have elements comprising a swellable elastomeric composition comprising one or more nanosensors therein. The nanosensors may sense temperature, pressure, composition of fluids, and the like, and may comprise means to transmit signals to the surface. The nanosensors may comprise means to receive signals. The means to transmit and receive signals may be wire, wireless, optical, and combinations thereof. For example, one or more nanosensors may engage one or more optical fibers as described in assignee's co-pending patent application Ser. No. 11/278,512, filed Apr. 3, 2006, and published as US PGPUB 2007/0337741 and incorporated herein by reference. As explained in the copending application, the optical fiber may either be deployed with coiled tubing, or deployed by flowing one or more fluids into a wellbore.

Operationally, zonal isolation tools such as that illustrated herein ultimately rely on linear compression, such as by movement of a linear piston along a base pipe to affect a seal, expanding an internal rubber or elastomeric seal member (not illustrated) and causing it to engage the borehole wall. A chamber is expanded by a fluid caused to flow through a passage, and after actuation, differential pressure energizes the seal member to form a cup-type seal. This internal elastomeric member therefore typically does not depend on water- or oil-swellability; however, under certain operating conditions, it may be desirable to have a swellable elastomeric composition comprising a nanosensor therein as the internal seal component, for example to measure pressures upstream and downstream of the seal, and measure or compute differential pressure.

FIG. 2 is a schematic perspective view, partially in cross-section, and not necessarily to scale, of an oilfield assembly 100 in accordance with the invention, in this case a packer. Although oilfield assembly 100 comprises in many instances more than one oilfield element, such as production tubing 104 and packer elements 108, oilfield assembly 100 is often referred to as a packer, and therefore this oilfield assembly may be considered an oilfield element which is part of a larger oilfield assembly. A production liner or casing 102 is shown, partially broken away to reveal production tubing 104, holddown slips 106, set-down slips 110, tail pipe and lower completion components 112, and a plurality of packer elements 108 which, when expanded, produce a hydraulic seal between a lower annulus 109 and an upper annulus 111. Packer elements 108 may comprise a swellable elastomeric composition comprising one or more nanosensors therein, for example to sense temperature of fluids, pressure of the wellbore, and the like.

FIGS. 3A and 3B illustrate two oilfield assemblies 200 and 250 known as bottom hole assemblies, or BHAs. Bottom hole assemblies have many wellbore elements that may benefit from use of swellable elastomeric compositions comprising one or more nanosensors in accordance with the teachings of the invention. The lower portion of the drillstring may comprise (from the bottom up in a vertical well) the bit, bit sub, a mud motor (in certain cases), stabilizers, drill collars, heavyweight drillpipe, jarring devices ("jars") and crossovers for various threadforms. The bottomhole assembly must provide force for the bit to break the rock (weight on bit), survive a hostile mechanical environment and provide the driller with directional control of the well. Oftentimes the assembly includes a mud motor, directional drilling and measuring equipment measurements-while-drilling (MWD) tools, logging-while-drilling (LWD) tools and other specialized devices. A simple BHA may comprise a bit, various crossovers, and drill collars, however they may include many other wellbore elements leading to a relatively complex wellbore assembly.

Each oilfield assembly 200 and 250 may comprise tubing 202, a connector 204, a check valve assembly 206, and a pressure disconnect 208. Oilfield assembly 200 is a straight hole BHA, and includes drill collars 210, a mud pump 216, and a drill bit 220. Oilfield assembly 250 is a BHA for buildup and horizontal bore holes, and includes an orienting tool 212, an MWD section in a non-magnetic drill collar 214, mud pump 216, and drill bit 220, as well as an adjustable bent housing 218. Many of these components may comprise swellable elastomers, and nanosensors therein may be used for components such as pump parts, gaskets for the LWD tools and MWD tools, and the like.

As may be seen by the exemplary embodiments illustrated in FIGS. 1-3 there are many possible uses of apparatus of the invention comprising elastomeric compositions as described and formed into shaped forms and including nanosensors therein, such as oilfield elements and assemblies. Alternatives are numerous.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. An apparatus comprising an oilfield element made of a swellable elastomeric composition, wherein the swellable elastomeric composition comprises a man-made swellable elastomer and one or more nanosensors dispersed therein to sense one or more parameters useful in oilfield operations; wherein the man-made elastomer comprises a reaction product of a linear or branched polymer having residual ethylenic unsaturation with an ethylenically unsaturated organic monomer having at least one reactive moiety selected from acid, acid anhydride, acid salt, and mixtures thereof.

2. The apparatus of claim 1 wherein the linear or branched polymer having residual ethylenic unsaturation is selected from polymers of ethylene-propylene-diene monomer (EPDM), natural rubber, cis-polybutadiene, trans-polyisoprene, ethylene-octene-based rubber, and combinations thereof.

3. The apparatus of claim 2, wherein the diene monomer is selected from non-conjugated dienes such as dicyclopentadiene, 5-ethylidene-2-norbornene, 5-methylene-2-norbornene 1,4-hexadiene, and the like.

4. The apparatus of claim 1 wherein the ethylenically unsaturated organic monomer having at least one reactive moiety is selected from acid, acid anhydride, and acid salt comprises more than one ethylenically unsaturated moiety.

5. The apparatus of claim 1 wherein the ethylenically unsaturated organic monomer is selected from maleic acid, acrylic acid, methacrylic acid, oleic acid, linoleic acid, linolenic acid, palmitoleic acid, anhydrides thereof, salts thereof, and mixtures thereof.

6. The apparatus of claim 1 wherein the linear or branched polymer having residual ethylenic unsaturation comprises from 1 to 100 percent of an oil-swell resistant polymer, with the balance comprising a water-swellable polymer.

7. The apparatus of claim 1 wherein the oilfield element is selected from submersible pump motor protector bags, packer elements, blow out preventer elements, zonal isolation tool elements, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seals used in fiber optic connections, pressure sealing elements for fluids, and combinations thereof.

8. The apparatus of claim 1 wherein the nanosensors are dispersed uniformly in the swellable elastomer.

9. The apparatus of claim 1 wherein the nanosensor is a material having at least one feature having nanoscale dimension.

10. The apparatus of claim 9 wherein the feature having nanoscale dimension is selected from pore diameter, wire diameter, platelet length, particle mean diameter, sensing material thickness, and two or more of these features.

11. The apparatus of claim 1 wherein the nanosensor comprises materials selected from functionalized and non-functionalized materials.

12. The apparatus of claim 1 wherein the nanosensor comprises one or more nanowires or nanotubes.

13. The apparatus of claim 1 wherein the one or more parameters useful in oilfield operations is selected from chemical composition, chemical reactivity, chemical moieties, physical properties, fluid mechanical properties, transport phenomena coefficients, electrical properties, gas-to-liquid ratio, and any two or more of these properties.

14. The apparatus of claim 1 wherein the nanosensors comprise means for transmitting and receiving signals.

15. The apparatus of claim 1 wherein the man-made elastomer is selected from thermoplastic elastomers and non-thermoplastic elastomers.

16. An oilfield assembly for exploring for, drilling for, testing for, or producing hydrocarbons comprising:
one or more oilfield elements selected from tubing, jointed pipe, sucker rods, submersible pump motor protector bags, packer elements, blow out preventer elements, zonal isolation tool elements, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seals used in fiber optic connections, pressure sealing elements for fluids, and combinations thereof; wherein the one or more of oilfield elements comprises a swellable elastomeric composition comprising a man-made swellable elastomer and one or more nanosensors dispersed therein to sense one or more parameters useful in oilfield operations; and wherein the man-made elastomer comprises a reaction product of a linear or branched polymer having residual ethylenic unsaturation with an ethylenically unsaturated organic monomer having at least one reactive moiety selected from acid, acid anhydride, acid salt, and mixtures thereof.

17. A method comprising:
(a) selecting one or more oilfield elements having a component comprising an elastomeric composition comprising a swellable elastomeric composition comprising a man-made swellable elastomer and one or more nanosensors dispersed therein to sense one or more parameters useful in oilfield operations; and wherein the man-made elastomer comprises a reaction product of a linear or branched polymer having residual ethylenic unsaturation with an ethylenically unsaturated organic monomer having at least one reactive moiety selected from acid, acid anhydride, acid salt, and mixtures thereof; and
(b) using the one or more oilfield elements in an oilfield operation, thus exposing the oilfield element to an oilfield environment.

18. The method of claim 17 wherein the oilfield element is selected from submersible pump motor protector bags, packer elements, blow out preventer elements, zonal isolation tool elements, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seals used in fiber optic connections, pressure sealing elements for fluids, and combinations thereof.

\* \* \* \* \*